United States Patent [19]

Savall et al.

[11] Patent Number: 5,147,547
[45] Date of Patent: Sep. 15, 1992

[54] OXIDATION AND BIOLOGICAL REDUCTION REACTOR, BIOFILTRATION METHOD AND WASHING METHODS USED IN THIS REACTOR

[75] Inventors: Vincent Savall, Velizy Villacoublay; Jean-Louis Vital, Boulogne, both of France

[73] Assignee: Degremont S.A., France

[21] Appl. No.: 800,353

[22] Filed: Dec. 2, 1991

[30] Foreign Application Priority Data

Dec. 3, 1990 [FR] France .................. 90 15088

[51] Int. Cl.$^5$ ............................................ C02F 3/06
[52] U.S. Cl. ................................. 210/605; 210/618; 210/150; 210/196; 210/283; 210/903
[58] Field of Search ............. 210/150, 151, 191, 277, 210/283, 284, 285, 292, 196, 605, 617, 618, 903, 792, 793, 794, 795

[56] References Cited

U.S. PATENT DOCUMENTS

| | | | |
|---|---|---|---|
| 4,076,616 | 2/1978 | Verde | 210/618 |
| 4,198,301 | 4/1980 | Iwatani | 210/274 |
| 4,800,021 | 1/1989 | Desbos | 210/618 |
| 4,931,138 | 6/1990 | Klein et al. | 210/151 |
| 5,079,268 | 5/1991 | Rogalla | 210/151 |

FOREIGN PATENT DOCUMENTS

| | | |
|---|---|---|
| 2538800 | 7/1984 | France . |
| 3158193 | 7/1988 | France . |
| 63-232892 | 9/1988 | Japan . |

*Primary Examiner*—Stanley S. Silverman
*Assistant Examiner*—Christopher Upton
*Attorney, Agent, or Firm*—Nixon & Vanderhye

[57] ABSTRACT

The present invention concerns an oxidation and biological reduction reactor for liquid to be treated by upwards circulation and recirculation including, within a longitudinal vertical enclosure 5 accessible by an admission 9, a lower layer 1 of biomass fixation made of material whose density is lower than that of the liquid and an upper layer of fixation 3 of biomass made of material whose density is higher than that of the liquid, characterized in that the lower layer 1 is separated from the upper layer 3 by a transverse wall 2 preventing the passage of filtration materials between a lower zone located under the wall 2 and an upper zone above the wall 2, an oxidation gas input 8 under the upper layer 3 and above the wall 2, an outlet 10 for the treated liquid is recycled by a pump 12 and an outer pipe 11 on the inlet 9.

14 Claims, 4 Drawing Sheets

OXIDATION AND BIOLOGICAL REDUCTION REACTOR, BIOFILTRATION METHOD AND WASHING METHODS USED IN THIS REACTOR

BACKGROUND OF THE INVENTION

The present invention concerns an oxidation and biological reduction reactor, a filtration process and washing procedures used in this reactor.

Such an oxidation and reduction reactor especially applies to the elimination of the organic and ammonia nitrogen found in urban and industrial waste waters. The oxidation transforms the ammonia nitrogen into nitrite and then into nitrate. The reduction transforms the nitric nitrogen into nitrogen These reactions are obtained by using bacterial cultures and may be carried out according to two methods, one called the free culture method, the other called the fixed culture method.

In the fixed culture of the prior art, the ability of most micro-organisms to produce exopolymers enabling their fixation on very different backings is used to form a biofilm. The fixed cultures as well as the free cultures may be used with aerobic or anaerobic treatments (fine granular medium biofilters, biofilters, biodisks, etc.).

Fixed cultures are used to obtain higher biomass concentrations (and sometimes activities) in the reactors, allowing the size of the works to be reduced.

A recommendation has been made to fix the microorganisms on granular backings whose effective bead size does not exceed 4 or 5 mm. These backings provide a specific developed surface (and thereby an exchange surface) that is much greater than that of other methods. By way of example, BIOLITE with an effective bead size of 2.7 mm develops an exchange surface of 700 m$^2$.m$^{-3}$.

Roughly, these granular medium bioreactors may be divided into two main categories:

Those where the matter in suspension initially present in the raw wastes as well as the excess sludge produced is retained at the same time as the biological purification. The fixed granular filters are also called biofilters.

Those in which the bioreactor only provides biological purification and the matter in suspension is separated by works found downstream. In the latter case, in order to optimize the micro-organism/substrate exchange surfaces, very fine granular materials in movement are used. These are the fluidized granular beds, as indicated in U.S. Pat. Nos. 3 846 289 and 4 009 099 (Ecolotrol denitrification and nitrification).

In the case of the second category, the fluidized bed reactors have the disadvantage of relating the speed of circulation of the fluid to the hydraulic characteristics (speed of fluidization, etc.) of the granular material chosen as a backing. Moreover, the fluidized beds do not enable the reliable and permanent maintenance of two separate zones, one of oxidation, the other of reduction in the same bed without the risk of mixing the materials and bacteria retained on these materials during variations in discharge.

In the first category, the "fixed granular beds" described above are classically made with materials that are more dense than water. In this case, we can speak of a "flowing bed". We can speak of a "floating bed" when the material is not as dense as water.

Patent FR 2 604 990 (OTV) describes a device consisting of a flowing bed comprising at least two layers of granular materials. Two zones, one aerobic and the other anaerobic are found within this bed. There are several disadvantages to this process:

the granulometries of the materials of both zones should be chosen so as to avoid the mixture of the grains in the adjacent zones;

the washing requires very fast water although the reclassification of the different layers is not foreseen in case there is a mixture of the zones.

Devices using floating beds have been recommended:

For example, patent FR 2 330 652 (Preussag) proposes the use of floating materials such as expanded polystyrene to create a biological denitrification reactor. However, this process can not be used to carry out the biological nitrification reaction since it only comprises one zone adapted to one reduction reaction (denitrification). This arrangement requires a large chamber at the upper part for the accumulation of washings in order to enable washing with a downward flow.

Several patents describe the devices using two layers of different materials in the reactor:

Patent FR 2 278 378 (Erpac) recommends the successive crossing of one floating bed layer and then two flowing bed layers in order to carry out the filtration. However, this does not enable a biological reactor to be envisaged since there is no injection of air. It has the disadvantage that it includes several means of support and retention or compaction of the materials. In addition, the washing conditions for the different beds are not favourable.

Patent GB 2 021 428 (Ishigaki Kiko) comprises a floating bed layer and an upper flowing bed layer separated by an intermediate wall. As in the previous patent, it does not enable a biological reactor for an oxidation reaction and a reduction reaction to be considered since there is no air injection for the process part and there is no introduction of washing air. In fact, the lower layer is designed for the filtration and the upper layer for the physico-chemical adsorption is not designed for washing.

Patent FR 2 632 947 (OTV) uses a bed consisting of layers serving as a biological reactor. It considers using these layers for the nitrification or denitrification. However, if both nitrification and denitrification reactions are to be combined within the same reactor, the characteristics of the materials from both layers may not be chosen independently. The characteristics of these two layers are related by the constraints resulting from the washing conditions. In fact, the washing is carried out with expansion since it is necessary to maintain the classification of the different layers Moreover, the oxidation gas circulates in the direction of the compression of the bed leading to a blockage of the circulation of the gas. This is the main problem that this patent wants to solve by choosing a density of material for the lower layer so that the layer is "agitated" (the patent indicates "fluidised"). The material, such as expanded floating slate or light polypropylene, which has such a density, is not available at a cost that is economically reasonable on an industrial scale.

This compression of the bed is therefore not favourable for the part of the bed forming the three-phase aerobic reactor In addition, this patent foresees the intermittent injection of the air (the patent indicates "by pulsation") to limit this disadvantage. In fact, there is a risk of air embolism and the preferential passage of the water or gas when the progressive fouling of the bed increases the loss of water circulation load The disadvantage of the prior art process is that it does not allow effective and economic nitrification and denitrification reactions (or more generally oxidation and reduction) in the same reactor.

SUMMARY OF THE INVENTION

The first object of the invention is to provide an oxidation and reduction reactor that is simple and economical to make, not requiring any reclassification operation of the materials used after washing and enabling a maximum choice of materials as regards granulometry and density.

This object is reached due to the fact that the oxidation and biological reduction reactor of liquid requiring treatment by upward circulation and recirculation includes, within a longitudinal vertical enclosure accessible by an inlet of liquid for treatment and an outlet of treated liquid respectively located at the lower and upper end of the enclosure, a lower layer for the fixation of the biomass made of material whose density is lower than that of the liquid and an upper layer for the fixation of the biomass made of material whose density is higher than that of the liquid, the lower layer is separated from the upper layer by a transverse wall only allowing the passage of the liquid between a first and second zones as defined, within the enclosure, the lower layer is located under the wall the upper layer above the wall, an admission of fluid or oxidation gas (for example air) is provided under the upper layer and above the wall, the outgoing treated liquid is recycled by a pump and an outer pipe on the inlet.

According to another characteristic of the invention, micro-organisms provide the oxidation forming the biomass fixed on the upper layer and bacteria provide the reduction forming the biomass fixed on the lower layer.

According to another characteristic, the microorganisms providing the oxidation are preferably nitrosomonas and the bacteria of nitrobacteria genus.

Another object of the invention is to provide the retention of the matter in suspension (MiS) at the same time as the biological purification.

This object is reached by the fact that the granulometry of the material whose density is lower than that of the liquid is chosen to be greater than that of the material whose density is greater than that of the liquid so that the flowing bed provides a filtration effect.

According to another characteristic of the invention, the granular material of the flowing bed for example, consists of sand, anthracite, pumice stone, expanded clay. The effective size is preferably between 1 and 5 mm and the material forming the floating bed for example consists of expanded polystyrene, polypropylene, polyurethane foam and its effective size is preferably between 1 and 5 mm, the size of the latter being greater than that of the former.

Another object is to allow part of the gas derived from the purification to be trapped.

This object is reached since the wall is made of impervious material and pintles are planned at regular intervals in the wall.

According to another characteristic, the pintles consist of an upper cylindrical cover, forming a fringe around the periphery, connected to a central tube passing through the wall and entering the compartment in the enclosure located under the wall by an opening communicating with the bed of floating material by a second cylindrical cover forming a fringe.

According to another characteristic, a blow-off or air admission opening is planned under the wall between the lower level of the wall and the level of the opening communicating with the pintles.

According to another characteristic, the reactor comprises a vent at the top of the enclosure, a water outlet valve at the top of the enclosure and a water flush valve at the bottom of the enclosure.

According to another characteristic, the reactor comprises a washing air supply pipe and a washings supply pipe entering the enclosure approximately at the level of the transverse wall.

Another object of the invention is to propose different washing procedures that may be used on the reactor.

This object is reached by the fact that the reactor washing process includes the following steps:

opening of the vent, opening of the sludge evacuation valve located below the enclosure to evacuate the sludge from the floating bed;

introduction of the washings by a washings pipe;

then closing of the enclosure valve to evacuate the sludge from the flowing bed towards the top.

Another object of the invention is to propose another washing process.

This object is reached since the washing process includes the following steps.

washing of the flowing bed with circulation of the matter in suspension towards the lower zone leading to an accumulation of the matter in suspension in the floating bed;

washing of the floating bed;

According to another characteristic, the floating bed is washed by supplying the pump with untreated water, inverting the direction of circulation in the pipe by known means and by opening the lower evacuation valve to flush the sludge and provoke fluidization.

According to a characteristic of the invention, the floating bed is washed by rapid flushing provoking the fluidization and unwatering of this bed.

Finally, a final object of the invention is to provide a washing method including the following steps:

circulation of the water in the enclosure by the pump from the bottom to the top in the outer pipe to wash the floating bed by accumulation of the matter in suspension in the flowing bed;

stop the pump;

supply untreated water by the input pipe of the untreated water for treatment;

washing air supply by the washing air feed pipe;

open the overflow air and water evacuation valve;

close the washing air admission;

air bleed the enclosure by opening the blow-off valve.

BRIEF DESCRIPTION OF THE DRAWINGS

Other characteristics and advantages of the present invention will appear more clearly upon reading the following description and referring to the appended drawings in which.

Figure 1:
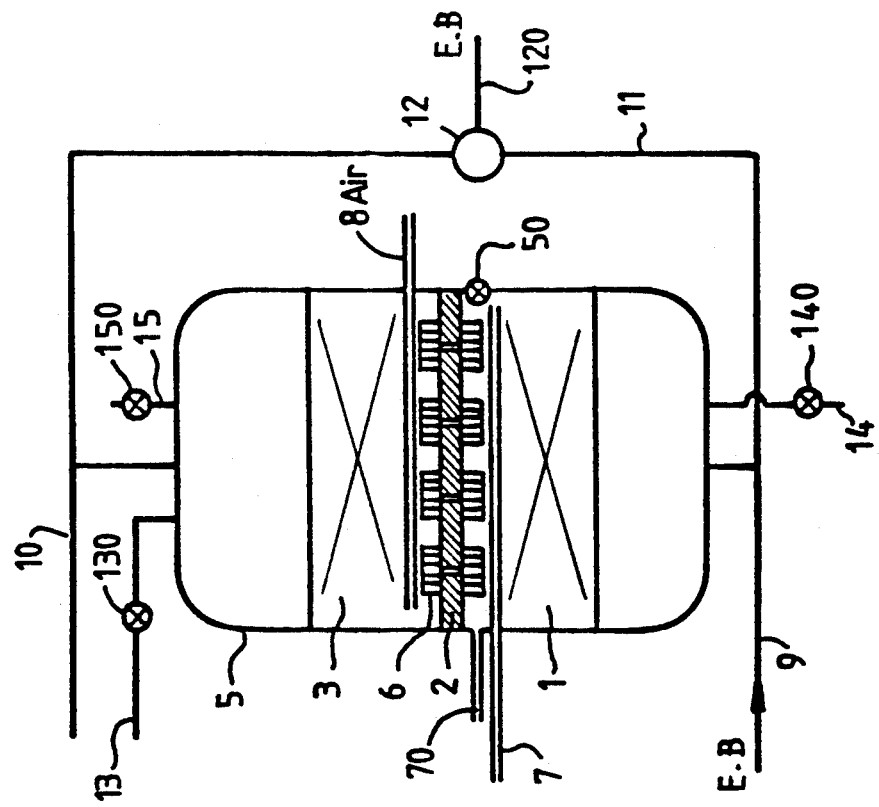
FIG. 1 represents a reactor according to the invention.

The reactor in FIG. 1 includes an enclosure 5 containing a floating bed 1 consisting of material whose density is lower than that of water, retained by a wall 2. A flowing bed 3 is assembled on this wall 2 consisting of materials that are more dense than water. The density of the granular material of the flowing bed 3 is higher than that of water and, for example, may consist of sand, anthracite, pumice stone, expanded clay, etc. Its effective size may be between 0.5 and 10 mm, preferably between 1 and 5 mm. The density of the granular material forming the floating bed 1 is lower than that of water and may, for example, consist of expanded polystyrene, polypropylene, polyurethane foam, etc. Its effective size may be between 0.5 and 10 mm, preferably between 1 and 5 mm. The characteristics of granulometry and density of both materials are independent of each other provided that one is floating and the other flowing. In an advantageous manner, the floating material may be chosen with a granulometry that is higher than that of the flowing material so that the flowing bed carried out a filtration operation by retention of the matter in suspension at the same time as oxidation. The choice of granulometry and the density of each of the two materials may therefore be carried out in an optimum manner, in order to obtain the biomass backing effect that should be nitrogen-reducing in the floating bed and nitrogen-fixing in the flowing bed and also in order to obtain a filtration effect in the flowing bed. The nitrogen-fixing biomass is chosen so as to oxidize the ammonia nitrogen into nitrite and then into nitrate according to the following reaction in which the degrees of oxidation are indicated in Roman numerals.

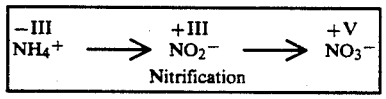

This reaction takes place in two steps by autograph micro-organisms:

oxidation of $NH_4^+$ (degree of oxidation minus 3) into $NO_2^-$ (degree of oxidation plus 3): this is essentially the work of the nitrosomonas;

oxidation of $NO_2^-$ into $NO_3^-$ (degree of oxidation plus 5): the bacteria responsible for this second reaction mainly belong to the genus nitrobacteria.

The overall simplified reaction for the nitrification may be written as:

The biomass of denitrification produces a reduction represented by the following reaction in which the degrees of oxidation are indicated in Roman numerals.

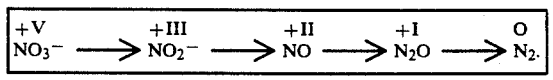

During this reaction, certain bacteria reduce the nitric nitrogen (degree of oxidation plus 5) to a lower state of oxidation.

Preferably, heterotrophic bacteria are used whose activity is greater than that of autotroph bacteria so as to carry out the following simplified overall reaction:

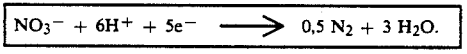

Figure 2:
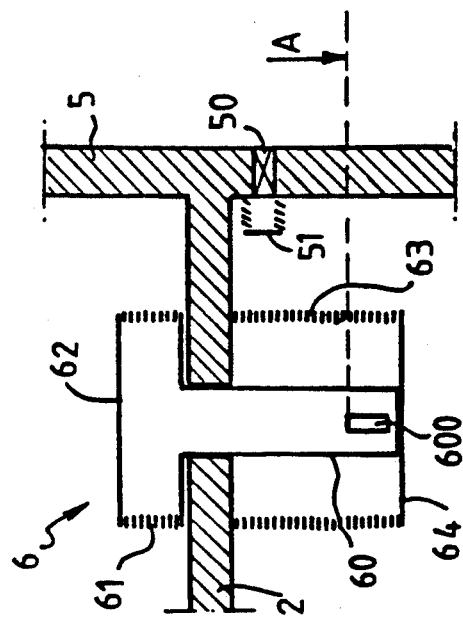
FIG. 2 represents a pintle used in the reactor.

The wall 2 is equipped with pintles 6 that, as represented in FIG. 2, include a central tube 60 opening on the upper part of the rudder pintle located above the wall 2 by a cover 62 with a fringe 61 around the periphery. This central tube has an opening 600 at the lower part located below the wall 2 at a distance A from the wall 2 providing the trapping of the nitrogen gas between the wall 2 and the level A. The periphery of tube 60 is surrounded by a fringe 63 and a lower cover 64 which avoids the migration of the floating material towards the nitrification zone. A blow-off valve 50 connected to a fringe 51 located inside the reactor is provided in the wall 5 of the enclosure between the level of the wall 2 and the level of the opening 600 to allow for the evacuation of the gas accumulated during the filtration process or washing process. During washing, the pintles 6 allow for the separate or simultaneous circulation and distribution of air or water through the wall 2. The reactor is equipped with an untreated water admission pipe 9 and a treated water outlet pipe 10. A pipe 11 equipped with a pump 12 and the means to reverse the direction of circulation in the pipes 11, among other things, enables the recirculation of the treated liquid from the top towards the bottom of the enclosure 5 in order to recycle it for denitrification. An untreated water inlet 120 on the pump 12 allows it to send the washings towards the top of the enclosure. The top of the device includes a pipe 15 equipped with a valve 150 enabling the evacuation of the washing air or the aeration of the enclosure. The reactor is equipped with a pipe 8 providing the air from the process associated inside the enclosure with a distributor enabling the distribution of the air and to distribute it to the bottom of the flowing bed layer 3. In addition, a washing inlet 7 provided near the wall 2, above or below it, may be associated with a distributor and enable the distribution of the water to provide the washing of the floating bed layer 1. Finally, a washing air inlet 70 is provided below the wall 2. Two washing sludge outlets 13, 14 are respectively available at the top and bottom of the device and are operated by the respective valves 130, 140.

The water to be treated by the reactor is introduced by the pipe 9 and circulates upwards in turn through both beds, first the floating bed 1 and then the flowing bed 3.

As seen above, the nitrification reaction requires oxygen which will be distributed at the bottom of the flowing bed 3 (the top bed) by the distributor 8. This flowing bed forms a three-phase reactor providing the co-current circulation of two fluids (water and oxidation gas). The fluids circulate in the direction of the decompression of the bed (therefore there is not any compaction during the increase in the loss of load during the cycle), avoiding the difficulties of gas circulation (risk of air embolism and preferential passage of water or gas) described in the prior art.

This nitrification reaction produces nitrates. A fraction of the treated flow containing nitrates is recycled by the pump 2 and the pipe towards the reactor entry.

Figure 3:
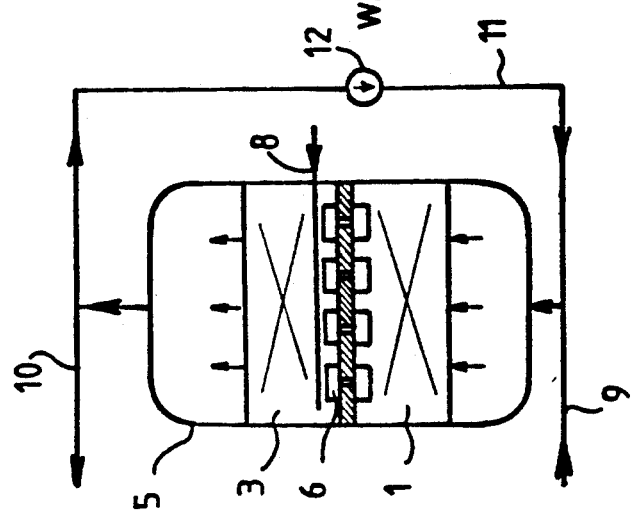
FIG. 3 describes the direction of fluid circulation during the biofiltration phase.

During biofiltration, the air is introduced by the pipe 8, the treated waters are evacuated by the pipe 10 and the mixture is recycled towards the bottom by the pump 12 and the pipe 11 as shown in FIG. 3.

The biofiltration process is regularly interrupted to carry out the washing operations of the reactor beds. This washing may be carried out according to three variants.

Figure 4:
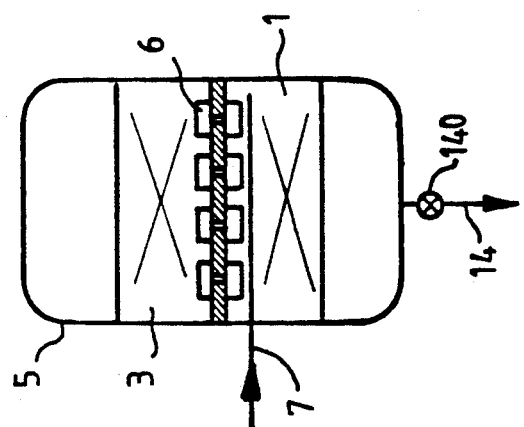
FIG. 4 describes the direction of fluid circulation during the phase for the washing of the floating bed according to a first variant.
Figure 5:
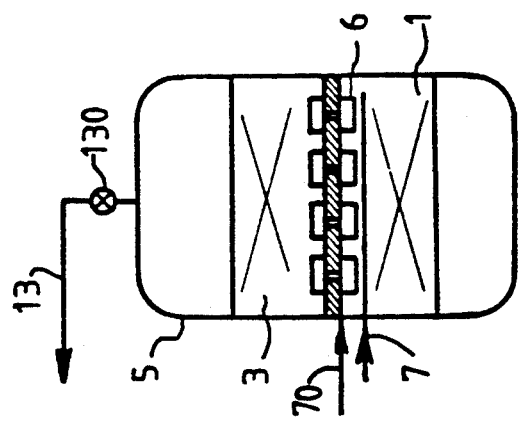
FIG. 5 describes the direction of fluid circulation during the phase of washing of the flowing bed according to a first variant.

The first washing variant shown in FIGS. 4 and 5 is carried out by introducing the washings by the pipe 7 between the two layers. The washing sludge exits by the pipe 14 if the floating bed 1 is washed and by the pipe 13 when the flowing bed 3 is washed. In order to increase the effectiveness of washing, it is also possible to use air which is introduced separately or simultaneously with water. The air may be introduced between the floating bed and flowing bed layers, as shown in FIG. 5, by the pipe 70.

Figure 8:
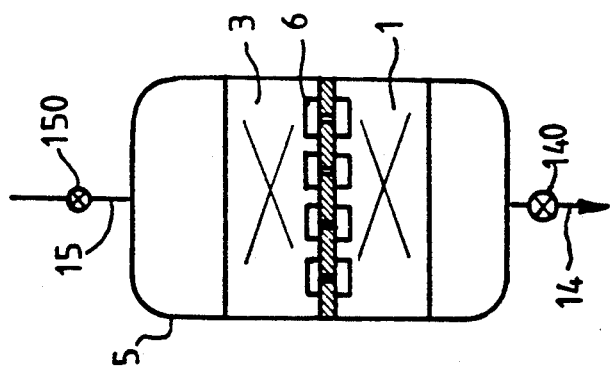
FIG. 8 provides the direction of circulation during the washing of the floating bed according to a second possibility of the second variant.
Figure 7:
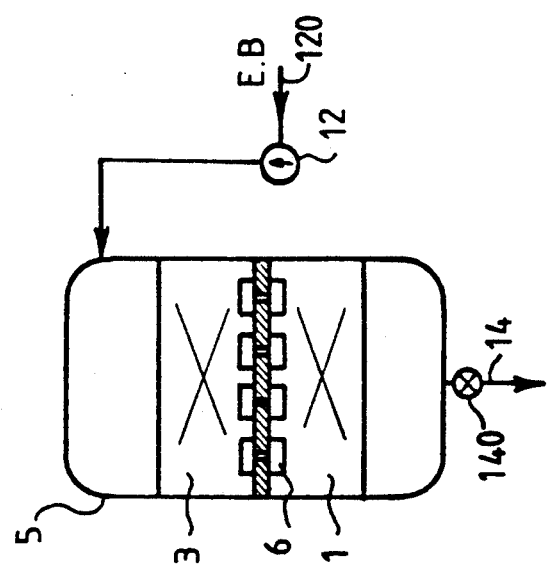
FIG. 7 provides the direction of fluid circulation during the washing of the floating bed according to a first possibility of the second variant.
Figure 6:
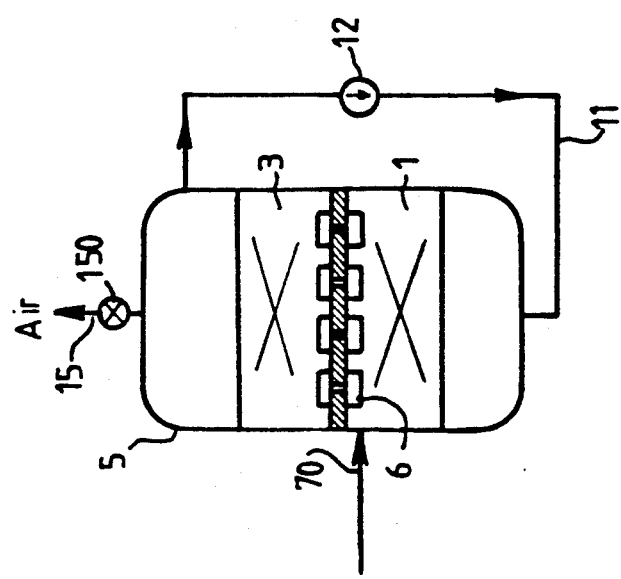
FIG. 6 provides the direction of fluid circulation during the washing of the flowing bed according to a second variant.

A second washing variant by accumulation in the floating bed is shown in FIGS. 6 to 8 using the external circulation by the pump 12 in the pipe 11. The flowing bed 3 is first washed by sending the washing air in the pipe 70 and by circulating the water from the top to the bottom in the pipe 11 by the pump 12. The vent valve 15 is opened. The matter in suspension derived from the flowing bed 3 is then recycled towards the floating bed 1, stopped by the latter and accumulates. Following this first step, the floating bed is loaded with the matter in suspension from both beds and it is washed according to one of the following options.

As shown in FIG. 7, the first option consists of using the pipe 120 to supply the pump 12 with untreated water to send the water towards the top of the enclosure and open the lower evacuation valve 140 towards the pipe 14 in order to provide the fluidization of the floating bed. This fluidization is maintained until all of the matter in suspension is eliminated.

As shown in FIG. 8, a second option consists of opening the upper valve 150 of the vent 15 and the lower valve 140, using the water located below the flowing bed 3, to carry out fluidization combined with the unwatering of the floating bed 1 according to the process described in French patent 2 611 529.

Figure 10:
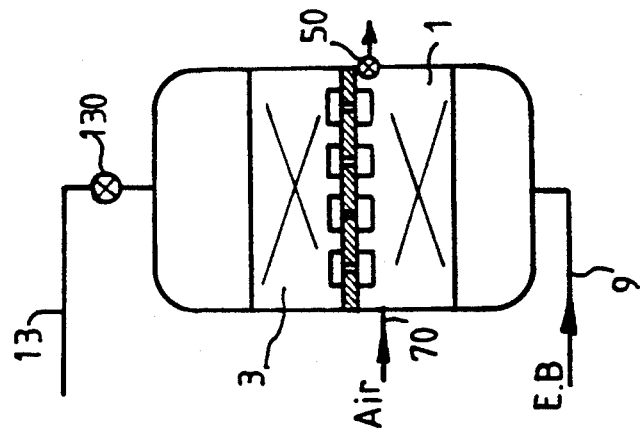
FIG. 10 represents the direction of circulation during the second washing phase according to the third variant.
Figure 9:
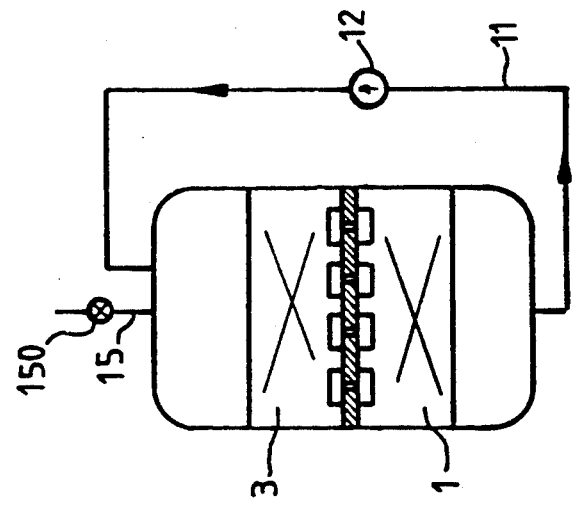
FIG. 9 provides the direction of circulation during the washing of the floating bed according to a third variant.

A third washing process with accumulation in the flowing bed, represented in FIGS. 9 and 10, consists of opening the valve 150 and then, as shown in FIG. 9, starting the pump 12 in the direction of circulation going from the bottom to the top in the pipe 11 in order to carry out, by the circulation of the water from the enclosure, the washing of the floating bed layer 1 by accumulating the matter in suspension in the flowing bed 3.

The second stage in the washing procedure consists of opening the valve 130 of the pipe 13, sending the air through the pipe 70 and washing the layer 3 with the untreated water introduced by the pipe 9 while the pump 12 is stopped. The untreated water prefiltered by the floating bed 1 cleans the flowing bed 3 and is evacuated by the pipe 13. The arrival of the washing air is then stopped by closing the pipe 70 and the air is blown off by the blow-off valve 50. The procedure ends by a rinsing stage consisting of introducing untreated water by the pipe 9 in the layer 1 and then resuming the treatment after rinsing In addition to the advantage of enabling the use of several washing methods, due to the separation wall 2, the described reactor allows for the use of materials whose granulometry and density are easier to choose. In addition, since the air distribution pipe 8 is in contact with the wall, it will be subject to less constraints than in devices using prior art procedures in which these pipes were subject to the stress of fouling filtration layers that act directly. This reactor also enables the creation of a type of washing without the consumption of clean water stored outside.

Finally, the air blow-off 50 under the floor avoids the conservation of an air cushion after washing the upper layer 3 which would result in the development of a nitrification process in the denitrification zone.

Any modification accessible to the professional is also part of the spirit of the invention.

We claim:

1. An oxidation and biological reduction reaction for liquid treatment by upward circulation and recirculation, comprising a longitudinal vertical enclosure having a liquid inlet means connected to a source of liquid for treatment and an outlet means for the treated liquid, respectively located at the lower and upper ends of the enclosure, a lower bed supporting fixed biomass made of material whose density is lower than that of the liquid, and upper bed supporting fixed biomass made of material whose density is higher than that of the liquid, wherein the lower layer is separated from the upper layer by a transverse wall means for preventing the passage of the filtration materials between a lower and an upper zone as defined in the enclosure with means for allowing passage of water, wherein the lower layer is located under the wall, and the upper layer above the wall, a gas inlet means connected to a source of oxidation gas is positioned under the upper layer and above the wall, and further comprising pump means for recycling treated liquid from the outlet to the liquid inlet.

2. Reactor according to claim 1, wherein microorganisms forming the biomass fixed on the upper layer create an oxidation reaction and the bacterial forming the biomass fixed on the lower layer create a reduction reaction.

3. Reactor according to claim 1, wherein the granulometry of the material whose density is lower than the liquid is chosen as larger than that of the material whose density is greater than that of the liquid, so that the upper bed provides a filtration effect.

4. Reactor according to claim 3, wherein the granular material of the upper bed comprises sand, anthracite, pumice stone, or expanded clay, and its effective size is between 1 and 5 mm; and the material forming the lower bed comprises expanded polystyrene, polypropylene, or polyurethane foam, and its effective size is between 1 and 5 mm, and greater than the effective size of the upper bed material.

5. Reactor according to claim 1, wherein the wall is made of impervious material and comprises hollow pintles at regular intervals in the wall.

6. Reactor according to claim 5, wherein the pintles comprise upper cylindrical covers having outlet fringes on the periphery, connected to a central tube passing through the wall and entering the enclosure compartment located under the wall by an opening communicating with the floating material bed by a second cylindrical cover having an inlet fringe.

7. Reactor according to claim 6, wherein a blow-off opening means for air admission is provided under the wall between the lower level of the wall and the level of the communication opening for the pintles.

8. Reactor according to claim 1, comprising a vent means at the top of the enclosure, a water outlet valve means at the top of the enclosure and a water flush valve means at the bottom of the enclosure.

9. Reactor according to claim 1, comprising a washing air input pipe and a washing input pipe emerging in the enclosure approximately at the level of the transverse wall.

10. A reactor washing process for an oxidation and biological reactor which treats liquids by upward circulation and recirculation, the reactor having a longitudinal vertical enclosure having a liquid inlet means connected to a source of liquid for treatment and an outlet means for the treated liquid, respectively located at the lower and upper ends of the enclosure, a lower bed supporting fixed biomass made of material whose density is lower than that of the liquid, and an upper bed supporting fixed biomass made of material whose density is higher than that of the liquid, wherein the lower layer is separated from the upper layer by a transverse wall means for preventing the passage of the filtration materials between a lower and an upper zone as defined in the enclosure with means for allowing passage of water, wherein the lower layer is located under the wall and the upper layer above the wall, a gas inlet means connected to a source of oxidation gas is positioned under the upper layer and above the wall, and further comprising pump means for recycling treated liquid from the outlet to the liquid inlet; the method comprising:

opening a vent at the top of the enclosure and opening a water flush valve at the bottom of the enclosure in order to evacuate sludge from the lower bed;
introducing washings by a washing input pipe emerging in the enclosure approximately at the level of the transverse wall, then
closing the water flush valve to evacuate sludge from the upper bed towards the top of the enclosure.

11. A reactor washing process for an oxidation and biological reactor which treats liquids by upward circulation and recirculation, the reactor having a longitudinal vertical enclosure having a liquid inlet means connected to a source of liquid for treatment and an outlet means for the treated liquid, respectively located at the lower and upper ends of the enclosure, a lower bed supporting fixed biomass made of material whose density is lower than that of the liquid, and an upper bed supporting fixed biomass made of material whose density is higher than that of the liquid, wherein the lower layer is separated from the upper layer by a transverse wall means for preventing the passage of the filtration materials between a lower and an upper zone as defined in the enclosure with means for allowing passage of water, wherein the lower layer is located under the wall and the upper layer above the wall, a gas inlet means connected to a source of oxidation gas is positioned under the upper layer and above the wall, and further comprising pump means for recycling treated liquid from the outlet to the liquid inlet; the method comprising:

washing the upper bed with circulation of material in suspension towards the lower zone leading to an accumulation of matter in suspension in the lower bed; and
washing the lower bed.

12. Washing process according to claim 11, wherein the lower bed is washed by supplying the pump with untreated water and reversing the direction of circulation to top to bottom and by flushing the sludge to provoke fluidization by opening a water flush valve at the bottom of the enclosure.

13. Washing method according to claim 11, wherein the lower bed is washed by a rapid flush provoking the fluidization and unwatering of this bed.

14. A reactor washing process for an oxidation and biological reactor which treats liquids by upward circulation and recirculation, the reactor having an longitudinal vertical enclosure having a liquid inlet means connected to a source of liquid for treatment and an outlet means for the treated liquid, respectively located at the lower and upper ends of the enclosure, a lower bed supporting fixed biomass made of material whose density is lower than that of the liquid, and an upper bed supporting fixed biomass made of material whose density is higher than that of the liquid, wherein the lower layer is separated from the upper layer by a transverse wall means for preventing the passage of the filtration materials between a lower and an upper zone as defined in the enclosure with means for allowing passage of water, wherein the lower layer is located under the wall and the upper layer above the wall, a gas inlet means connected to a source of oxidation gas is positioned under the upper layer and above the wall, and further comprising pump means for recycling treated liquid from the outlet to the liquid inlet, the method comprising:

using said recycling pump in reverse flow to circulate water in the enclosure from the top of the enclosure to the bottom of the enclosure and through an outer pipe connecting the bottom of the enclosure and the top of the enclosure;
stopping the pump;
admitted untreated water to the liquid inlet means;
supplying washing air through a pipe emerging in the enclosure approximately at the level of the transverse wall;
opening a valve at the top of the enclosure for permitting air to escape therefrom;
closing the pipe through which the washing air was supplied; and,
opening a blow-off valve for permitting air to escape from the enclosure, the blow-off valve being provided under the transverse wall.

* * * * *